United States Patent
Tang et al.

(10) Patent No.: US 11,603,428 B2
(45) Date of Patent: Mar. 14, 2023

(54) METHODS FOR REDUCING ALDEHYDE EMISSIONS IN POLYURETHANE FOAMS

(71) Applicant: Dow Global Technologies LLC, Midland, MI (US)

(72) Inventors: Zhengming Tang, Shanghai (CN); Jian Zou, Shanghai (CN); Shaoguang Feng, Shanghai (CN); Yuji Sasaki, Gotemba (JP); Hongliang Chen, Shanghai (CN); Haiying Li, Shanghai (CN); Degang Zhang, Shanghai (CN); Ping Zhang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/262,824

(22) PCT Filed: Aug. 2, 2018

(86) PCT No.: PCT/CN2018/098375
§ 371 (c)(1),
(2) Date: Jan. 25, 2021

(87) PCT Pub. No.: WO2020/024230
PCT Pub. Date: Feb. 6, 2020

(65) Prior Publication Data
US 2021/0301065 A1  Sep. 30, 2021

(51) Int. Cl.
| | | |
|---|---|---|
| *C08G 18/66* | (2006.01) |
| *C08G 18/20* | (2006.01) |
| *C08G 18/32* | (2006.01) |
| *C08G 18/40* | (2006.01) |
| *C08G 18/48* | (2006.01) |
| *C08G 18/63* | (2006.01) |
| *C08G 18/64* | (2006.01) |
| *C08J 9/12* | (2006.01) |
| *C08K 3/30* | (2006.01) |

(52) U.S. Cl.
CPC ..... *C08G 18/6688* (2013.01); *C08G 18/2063* (2013.01); *C08G 18/3206* (2013.01); *C08G 18/3275* (2013.01); *C08G 18/4081* (2013.01); *C08G 18/4841* (2013.01); *C08G 18/632* (2013.01); *C08G 18/6423* (2013.01); *C08J 9/125* (2013.01); *C08K 3/30* (2013.01); *C08G 2110/0083* (2021.01); *C08J 2203/10* (2013.01); *C08J 2375/08* (2013.01)

(58) Field of Classification Search
CPC .... C08G 18/08; C08G 18/14; C08G 18/2063; C08G 18/3206; C08G 18/3275; C08G 18/4081; C08G 18/4841; C08G 18/632; C08G 18/6423; C08G 18/6688; C08G 18/76; C08G 2101/00; C08G 2110/0083; C08J 9/125; C08J 2203/10; C08J 2375/08; C08K 3/08; C08K 3/30; C08K 5/005; C08K 5/13; C08K 5/17; C08K 5/3462
See application file for complete search history.

(56) References Cited

U.S. PATENT DOCUMENTS

| | | |
|---|---|---|
| 5,506,329 A | 4/1996 | Chou |
| 2003/0158279 A1 | 8/2003 | Becker |
| 2012/0184639 A1 | 7/2012 | Haas |
| 2013/0203880 A1 | 8/2013 | George |
| 2017/0088497 A1 | 3/2017 | Xie |
| 2017/0129988 A1* | 5/2017 | Dries ................ C08G 18/3887 |
| 2019/0040254 A1 | 2/2019 | Nishikita |

FOREIGN PATENT DOCUMENTS

| | | |
|---|---|---|
| JP | 2005-154599 A | 6/2005 |
| WO | 2006/111492 A | 10/2006 |
| WO | 2009/114329 A | 9/2009 |
| WO | 2017/163863 A | 9/2017 |

* cited by examiner

*Primary Examiner* — John M Cooney

(57) ABSTRACT

Polyurethane foams are made by curing a reaction mixture that contains an aromatic polyisocyanate, at least one isocyanate-reactive material having an average functionality of at least 2 and an equivalent weight of at least 200 per isocyanate-reactive group, at least one blowing agent, at least one surfactant and at least one catalyst, a polyethyleneamine mixture having a number average molecular weight of 175 to 450 and an alkali metal, phosphonium or ammonium sulfite. Foams so produced emit low levels of formaldehyde, acetaldehyde, acrolein and propionaldehyde.

5 Claims, No Drawings

METHODS FOR REDUCING ALDEHYDE EMISSIONS IN POLYURETHANE FOAMS

This invention relates to polyurethanes that exhibit low levels of aldehyde emissions, and to methods for producing such polyurethanes.

Polyurethane foams are used in many office, household and vehicular applications. They are used, for example, in appliance applications and as cushioning for bedding and furniture. In automobiles and trucks, polyurethanes are used as seat cushioning, in headrests, in dashboards and instrument panels, in armrests, in headliners, and other applications.

These polyurethanes often emit varying levels of aldehydes such as formaldehyde, acetaldehyde, acrolein (propenyl aldehyde) and propionaldehyde. Because of the cellular structure of these foams, aldehydes contained in the foam easily escape into the atmosphere. This can present an odor concern and an exposure concern, especially when people or animals are exposed to the material within an enclosed space. Vehicle manufacturers are imposing stricter limits on the emissions from materials that are used in the passenger cabins of cars, trucks, trains and aircraft.

Scavengers are sometimes used to reduce aldehyde emissions from various types of materials. In the polyurethane field, there is, for example, WO 2006/111492, which describes adding antioxidants and hindered amine light stabilizers (HALS) to polyols to reduce aldehydes. WO 2009/114329 describes treating polyols with certain types of aminoalcohols and treating polyisocyanates with certain nitroalkanes, in order to reduce aldehydes in the polyols and polyisocyanates, respectively, and in polyurethanes made from those materials. JP 2005-154599 describes the addition of an alkali metal borohydride to a polyurethane formulation for that purpose. U.S. Pat. No. 5,506,329 describes the use of certain aldimine oxazolidine compounds for scavenging formaldehyde from polyisocyanate-containing preparations, and describes nitroalkanes and aminoalcohols as formaldehyde scavengers in textile and plywood applications.

These approaches provide limited benefit, in part because aldehydes present in polyurethane foam are not always carried in from the raw materials used to make the foam. Formaldehyde and acetaldehyde in particular can form during the curing step or when the foam is later subjected to UV light, elevated temperatures or other conditions. In addition, measures that are effective against formaldehyde emissions are not always effective against acetaldehyde, acrolein or propionaldehyde emissions, and vice versa. In some cases, measures that are effective in reducing acetaldehyde emissions can actually cause an increase in formaldehyde emissions. Applicants have further found that the presence of HALS often leads to an increase in formaldehyde emissions, acetaldehyde emissions or both.

PCT/CN2017/073764 describes the use of aminoalcohols together with certain antioxidants to reduce aldehyde emissions from polyurethane foam. This combination provides some improvement, but a greater reduction of aldehyde emissions is wanted.

US2017/0088497 describes polyol compositions that contain polyethyleneimines and and alkali metal bisulfite. A 2500 molecular weight polyethyleneimine material is described in the examples. The combination of this 2500 molecular weight polyethyleneimine and sodium bisulfite was effective in reducing formaldehyde and acetaldehyde emissions. However, still better performance is wanted.

Therefore, a method for effectively and economically reducing formaldehyde, acetaldehyde, acrolein and propionaldehyde emissions is wanted. Preferably, this method does not result in a significant change in the properties or performance of the polyurethane.

This invention is a process for producing a polyurethane foam comprising forming a reaction mixture that contains an aromatic polyisocyanate, at least one isocyanate-reactive material having an average functionality of at least 2 and an equivalent weight of at least 200 per isocyanate-reactive group, at least one blowing agent, at least one surfactant and at least one catalyst, and curing the reaction mixture in the presence of (i) a polyethyleneamine mixture having a number average molecular weight of 175 to 450 and (ii) an alkali metal, ammonium or phosphonium sulfite, to form the polyurethane foam.

The invention is also a process for reducing aldehyde emissions from a polyurethane foam, comprising: a) combining (i) a polyethyleneamine mixture having a number average molecular weight of 175 to 450 and (ii) an alkali metal, ammonium or phosphonium sulfite with at least one isocyanate-reactive material having an average functionality of at least 2 and an equivalent weight of at least 200 per isocyanate-reactive group to form a mixture and then b) combining the mixture from step a) with at least one organic polyisocyanate and curing the resulting reaction mixture in the presence of at least one blowing agent, at least one surfactant and at least one catalyst to form a polyurethane foam.

The invention is also a polyurethane foam made in either of the foregoing processes.

The combination of the a polyethyleneamine mixture having a number average molecular weight of 175 to 450 and alkali metal, ammonium or phosphonium sulfite has been found to reduce the levels of each of formaldehyde, acetaldehyde, acrolein and propionaldehyde emitted by the polyurethane foam.

To produce foam in accordance with the invention, at least one polyisocyanate is reacted with at least one isocyanate-reactive compound that has a functionality of at least 2 and an equivalent weight of at least 200 per isocyanate-reactive group. Other ingredients may be present as discussed hereinbelow. The reaction is performed in the presence of the a polyethyleneamine mixture having a number average molecular weight of 175 to 450 and/or hydroxylamine and the alkali metal, ammonium or phosphonium sulfite.

The a polyethyleneamine mixture having a number average molecular weight of 175 to 450 and alkali metal, ammonium or phosphonium sulfite can be provided as a mixture with any one or more of the various ingredients of the formulation used to produce the foam. Alternatively, these may be added into the reaction as a separate component or stream without being previously combined with any of the other ingredients.

Preferably, however, the a polyethyleneamine mixture having a number average molecular weight of 175 to 450 and alkali metal, ammonium or phosphonium sulfite are blended with the isocyanate reactive compound(s) that have at least two isocyanate-reactive groups per molecule and an equivalent weight of at least 200 per isocyanate-reactive group, prior to forming the polyurethane foam. The resulting blend is maintained at approximately room temperature or a higher temperature (but below the boiling temperature of the polyethyleneamine mixture having a number average molecular weight of 175 to 450 and below the temperature at which the polyol degrades) for a period of at least 30 minutes prior to making the foam. Such a blend may be maintained under such conditions for any arbitrarily longer time, such as up to a month, up to a week, or up to a day.

A suitable amount of a polyethyleneamine mixture having a number average molecular weight of 175 to 450 is from 0.01 to 1 pph (i.e., 0.10 to 1 parts by weight per 100 parts by weight of isocyanate reactive compound(s) that have at least two isocyanate-reactive groups per molecule and an equivalent weight of at least 200 per isocyanate-reactive group). The amount of polyethyleneamine mixture having a number average molecular weight of 175 to 450 may be at least 0.02, at least 0.03 pph or at least 0.04 pph and may be up to 0.5 pph, up to 0.25 pph, up to 0.15 pph or up to 0.1 pph.

The polyethyleneamine mixture is a mixture of linear, branched and/or cyclic polyethyleneamines. Polyethyleneamines are chemical compounds characterized in having multiple —$CH_2$—$CH_2$—NH— groups.

The number average molecular weight of the polyethyleneamine mixture may be, for example, at least 200 or at least 225. It may be up to 400, up to 350 or up to 325. Although the number average weight should fall within the aforementioned ranges, the polyethyleneamine mixture typically will contain a range of polyehthyleneamine molecules having various molecular weights, some proportion of which may have molecular weights lower than 175 or higher than 450. This is acceptable provided the number average molecular weight falls within the ranges described above. The polyethyleneamine mixture preferably contains no more than 10 weight percent, especially no more than 5 weight percent or no more than 2 weight percent, of polyethyleneamines having a molecular weight of 125 or lower. Similarly, the polyethyleneamine mixture preferably contains no more than 10 weight percent, especially no more than 5 weight percent or no more than 2 weight percent, of polyethyleneamines having a molecular weights of 600 or higher.

The polyethyleneamines contained within the polyethyleneamine mixture may include, for example, compounds having either of the following structures I and II:

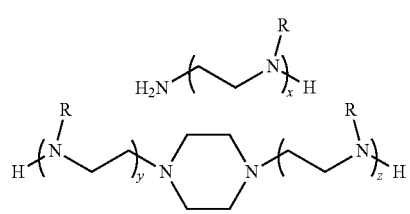

wherein x and y each are positive numbers, z is zero or a positive number and each R is independently hydrogen, ethyleneamine or linear, branched and/or cyclic polyethyleneamine. x, y and z are selected such that the number average molecular weight of the polyethylenamine is as described before. For particular compounds within the polyethyleneamine mixture, x is preferably 3 to 17, especially 6 to 12. When each R is hydrogen, y+z is preferably 3 to 17, especially 6 to 12, for particular compounds within the polyethyleneamine mixture. When R is ethylene amine or polyethyleneamine, the value of x+y is preferably such that the particular compounds within the polyethyleneamine mixture contain 3 to 17, especially 6 to 12, nitrogen atoms.

Suitable polyethyleneamine mixtures are available commercially. An example of such a commercially available material is sold by The Dow Chemical Company as Heavy Polyamine X. That material has a number average molecular weight of 275 g/mol.

The alkali metal, ammonium or phosphonium sulfite includes compounds having the formula $A_2SO_3$, where A represents alkali metal, ammonium or phosphonium, and alkali metal, ammonium or phosphonium hydrogen sulfite (alkali metal, ammonium or phosphonium bisulfite) compounds having the formula $AHSO_3$, where A is as before. Examples of such compounds include, for example, dilithium sulfite, disodium sulfite, dipotassium sulfite, di(tetramethyl ammonium) sulfite, di(tetramethyl phosphonium) sulfite, lithium hydrogen sulfite ($LiHSO_3$), sodium hydrogen sulfite ($NaHSO_3$), potassium hydrogen sulfite ($KHSO_3$), cesium hydrogen sulfite ($CsHSO_3$), (tetramethyl ammonium) hydrogen sulfite, (tetramethyl phosphonium) hydrogen sulfite, with the sodium compounds being preferred among these. A suitable amount of alkali metal, ammonium or phosphonium sulfite is from 0.01 to 5 pph. The amount of alkali metal, ammonium or phosphonium sulfite may be at least 0.02 pph, at least 0.025 pph or at least 0.05 pph and may be up to 2 pph, up to 1 pph, up to 0.5 pph, up to 0.25 pph or up to 0.2 pph.

The foam formulation includes at least one isocyanate-reactive compound that has a functionality of at least 2 and an equivalent weight of at least 200 per isocyanate-reactive group. "Functionality" refers to the average number of isocyanate-reactive groups per molecule. The functionality may be as much as 8 or more but preferably is from 2 to 4. The isocyanate groups may be, for example, hydroxyl, primary amino or secondary amino groups, but hydroxyl groups are preferred. The equivalent weight may be up to 6000 or more, but is preferably from 500 to 3000 and more preferably from 1000 to 2000. This isocyanate-reactive compound may be, for example, a polyether polyol, a polyester polyol, a hydroxyl-terminated butadiene polymer or copolymer, a hydroxyl-containing acrylate polymer, and the like. A preferred type of isocyanate-reactive compound is a polyether polyol, especially a polymer of propylene oxide or a copolymer of propylene oxide and ethylene oxide. A copolymer of propylene oxide and ethylene oxide may be a block copolymer having terminal poly(oxyethylene) blocks and in which at least 50% of the hydroxyl groups are primary. Another suitable copolymer of propylene oxide and ethylene oxide may be a random or pseudo-random copolymer, which may also contain terminal poly(oxyethylene) blocks and in which at least 50% of the hydroxyl groups are primary.

Polyester polyols that are useful as the isocyanate-reactive compound include reaction products of polyols, preferably diols, with polycarboxylic acids or their anhydrides, preferably dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols used in making the polyester polyols preferably have an equivalent weight of about 150 or less and include ethylene glycol, 1,2- and 1,3-propylene glycol, 1,4- and 1,3-butane diol, 1,6-hexane diol, 1,8-octane diol, neopentyl glycol, cyclohexane dimethanol, 2-methyl-1,3-propane diol, glycerine, trimethylolpropane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol and the like. Polycaprolactone polyols such as those sold by The Dow Chemical Company under the trade name "Tone" are also useful.

Mixtures of two or more of the foregoing isocyanate-reactive compounds having a functionality of at least 2 and an equivalent weight of at least 200 per isocyanate-reactive group can be used if desired.

The isocyanate-reactive compound(s) may contain dispersed polymer particles. These so-called polymer polyols contain, for example, particles of vinyl polymers such as styrene, acrylonitrile or styrene-acrylonitrile, particles of a polyurea polymer, or polymers of a polyurethane-urea polymer.

In addition, such isocyanate-reactive compounds can be used in admixture with one or more crosslinkers and/or chain extenders. For purposes of this specification, "crosslinkers" are compounds having at least three isocyanate-reactive groups per molecule and an equivalent weight per isocyanate-reactive group of below 200. "Chain extenders" for purposes of this invention have exactly two isocyanate-reactive groups per molecule and have an equivalent weight per isocyanate-reactive group of below 200. In each case, the isocyanate-reactive groups are preferably hydroxyl, primary amino or secondary amino groups. Crosslinkers and chain extenders preferably have equivalent weights of up to 150 and more preferably up to about 125.

Examples of crosslinkers include glycerin, trimethylolpropane, trimethylolethane, diethanolamine, triethanolamine, triisopropanolamine, alkoxylates of any of the foregoing that have equivalent weights of up to 199, and the like. Examples of chain extenders include alkylene glycols (e.g., ethylene glycol, propylene glycol, 1,4-butane diol, 1,6-hexanediol and the like), glycol ethers (such as diethylene glycol, triethylene glycol, dipropylene glycol, tripropylene glycol and the like), ethylene diamine, toluene diamine, diethyltoluene diamine and the like, as well as alkoxylates of any of the foregoing that have equivalent weights of up to 199, and the like.

Crosslinkers and/or chain extenders are typically present in small amounts (if at all). A preferred amount is from 0 to 5 pph of crosslinkers and/or chain extenders. A more preferred amount is from 0.05 to 2 pph and a still more preferred amount is from 0.1 to 1 pph of one or more crosslinkers.

Examples of suitable polyisocyanates include, for example, m-phenylene diisocyanate, 2,4- and/or 2,6-toluene diisocyanate (TDI), the various isomers of diphenylmethanediisocyanate (MDI), the so-called polymeric MDI products (which are a mixture of polymethylene polyphenylene polyisocyanates in monomeric MDI), carbodiimide-modified MDI products (such as the so-called "liquid MDI" products which have an isocyanate equivalent weight in the range of 135-170), hexamethylene-1,6-diisocyanate, tetramethylene-1,4-diisocyanate, cyclohexane-1,4-diisocyanate, hexahydrotoluene diisocyanate, hydrogenated MDI ($H_{12}$MDI), isophorone diisocyanate, naphthylene-1,5-diisocyanate, methoxyphenyl-2,4-diisocyanate, 4,4'-biphenylene diisocyanate, 3,3'-dimethyoxy-4,4'-biphenyl diisocyanate, 3,3'-dimethyldiphenyl methane-4,4'-diisocyanate, 4,4',4"-triphenylmethane diisocyanate, hydrogenated polymethylene polyphenylpolyisocyanates, toluene-2,4,6-triisocyanate and 4,4'-dimethyldiphenylmethane-2,2',5,5'-tetraisocyanate. Any of the foregoing that is modified to contain urethane, urea, uretonimine, biuret, allophonate and/or carbodiimide groups may be used.

Preferred isocyanates include TDI, MDI and/or polymeric MDI, as well as derivatives of MDI and/or polymeric MDI that contain urethane, urea, uretonimine, biuret, allophonate and/or carbodiimide groups. An especially preferred isocyanate is a mixture of TDI and MDI.

The amount of polyisocyanate provided to the foam formulation is expressed as the "isocyanate index", which is 100 times the ratio of isocyanate groups to isocyanate-reactive groups in the foam formulation. The isocyanate index is typically from about 70 to 150. A preferred isocyanate index is from 80 to 125 and a more preferred isocyanate index is from 80 to 115. In some embodiments, the isocyanate index is from 90 to 115 or from 95 to 115.

The blowing agent may be a chemical (exothermic) type, a physical (endothermic) type or a mixture of at least one of each type. Chemical types typically react or decompose to produce carbon dioxide or nitrogen gas under the conditions of the foaming reaction. Water and various carbamate compounds are examples of suitable chemical blowing agents. Physical types include carbon dioxide, various low-boiling hydrocarbons, hydrofluorocarbons, hydroflurochlorocarbons, ethers and the like. Water is most preferred blowing agent, either by itself or in combination with one or more physical blowing agents.

Blowing agents are present in amounts sufficient to provide the desired foam density. When water is the blowing agent, a suitable amount is generally from 1.5 to 6 pph, preferably from 2 to 5 pph.

Suitable surfactants are materials that help to stabilize the cells of the foaming reaction mixture until the materials have cured. A wide variety of silicone surfactants as are commonly used in making polyurethane foams can be used in making the foams with the polymer polyols or dispersions of this invention. Examples of such silicone surfactants are commercially available under the tradenames Tegostab™ (Evonik Corporation), Niax™ (Momentive) and Dabco™ (Air Products and Chemicals).

Surfactants are typically present in amounts up to 5 pph, more typically from 0.1 to 2 pph and preferably from 0.25 to 1.5 pph.

Suitable catalysts include those described by U.S. Pat. No. 4,390,645, which is incorporated herein by reference. Representative catalysts include:

(a) tertiary amines, such as trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, bis(2-dimethylaminoethyl) ether, morpholine,4,4'-(oxydi-2,1-ethanediyl)bis, tri(dimethylaminopropyl)amine, pentamethyldiethylenetriamine and triethylenediamine and the like; as well as so-called "low emissive" tertiary amine catalysts that contain one or more isocyanate-reactive groups such as dimethylaminopropylamine and the like;

(b) tertiary phosphines, such as trialkylphosphines and dialkylbenzylphosphines;

(c) chelates of various metals, such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni;

(d) acidic metal salts of strong acids, such as ferric chloride, stannic chloride, stannous chloride, antimony trichloride, bismuth nitrate and bismuth chloride;

(e) strong bases, such as alkali and alkaline earth metal hydroxides, alkoxides and phenoxides;

(f) alcoholates and phenolates of various metals, such as $Ti(OR)_4$, $Sn(OR)_4$ and $Al(OR)_a$, wherein R is alkyl or aryl, and the reaction products of the alcoholates with carboxylic acids, beta-diketones and 2-(N,N-dialkylamino)alcohols;

(g) salts of organic acids with a variety of metals, such as alkali metals, alkaline earth metals, Al, Sn, Pb, Mn, Co, Ni and Cu including, for example, sodium acetate, stannous octoate, stannous oleate, lead octoate, metallic driers, such as manganese and cobalt naphthenate; and (h) organometallic derivatives of tetravalent tin, trivalent and pentavalent As, Sb and Bi and metal carbonyls of iron and cobalt.

Catalysts are typically present in small amounts, such as up to 2 pph and generally up to 1 pph. A preferred amount of catalyst is from 0.05 to 1 pph.

It is preferred to produce the foam in the presence of at least one antioxidant. Such an antioxidant may be blended with the isocyanate reactive compound(s) that have at least two isocyanate-reactive groups per molecule and an equivalent weight of at least 200 per isocyanate-reactive group prior to forming the polyurethane foam, in the manner described above with regard to the polyethyleneamine mixture having a number average molecular weight of 175 to 450. Alternatively, it may be added into the reaction mixture with one or more other ingredients and/or as a separate ingredient or stream.

Examples of suitable antioxidants include, for example:
1) Phenolic compounds such as 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol, 2,4-dioctylthiomethyl-6-tert-butylphenol, 2,4-dioctylthiomethyl methylphenol, 2,4-dioctylthiomethyl-6-ethylphenol, 2,6-di-dodecylthiomethyl-4-nonylphenol, 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate, 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra(5-tert-butyl-4-hydroxy-2-methylphenyl)pentane, 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol, esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane, esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

2) Aminic antioxidants such as N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butyl-aminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetra-methyl-4,4'-diaminodiphenylmethane, 1,2-bis[(2-methylphenyl)amino]

ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, and the like;

3) Thiosynergists such as dilauryl thiodipropionate or distearyl thiodipropionate;

4) Phosphites and phosphonites such as triphenyl phosphite, diphenylalkyl phosphites, phenyldialkyl phosphites, tris (nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis (2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2''-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane;

5) Benzofuranones and indolinones such as those disclosed in U.S. Pat. Nos. 4,325,863; 4,338,244; 5,175,312; 5,216,052; 5,252,643; DE-A-4316611; DE-A-4316622; DE-A-4316876; EP-A-0589839 or EP-A-0591102, including for example 3-[4-(2-acetoxyethoxy)phenyl]-5,7-di-tert-butyl-benzofuran-2-one, 5,7-di-tert-butyl-3-[4-(2-stearoyloxy-ethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-burylbenzofuran-2-one, as well as 6) tocophenols, hydroxylated thiodiphenyl ethers, O-, N- and S-benzyl compounds, hydroxybenzylated malonates, triazine compounds, benzylphosphonates, acylaminophenols, amides of β-(3,5-di-tert-butyl-4-hydroxyphenyl)propionic acid, ascorbic acid (vitamin C), 2-(2'-hydroxyphenyl) benzotriazoles, 2-hydroxybenzophenones, esters of substituted and unsubstituted benzoic acids, acrylates, nickel compounds, oxamides, 2-(2-hydroxyphenyl)-1,3,5-triazines, hydroxylamines, nitrones, esters of β-thiodipropionic acid, as described, for example, in U.S. Pat. No. 6,881,774, incorporated herein by reference.

Preferred antioxidants include:
a) mixtures of at least one phenolic compound as described in 1) above with at least one phosphite or phosphonite compound as described in 4) above;
b) mixtures of at least one phenolic compound as described in 1) above with at least one benzofuranone or indolinone compound as described in 5) above;
c) mixtures of at least one phenolic compound as described in 1) above with at least one aminic antioxidant as described in 2) above;
d) mixtures of at least one phenolic compound as described in 1) above with at least one phosphite or phosphonite compound as described in 4) above and at least one benzofuranone or indolinone compound as described in 5) above;
e) mixtures of at least one phenolic compound as described in 1) above with at least one phosphite or phosphonite compound as described in 4) above and at least one aminic compound as described in 2) above;
f) mixtures of at least one phenolic compound as described in 1) above with at least one phosphite or phosphonite compound as described in 4) above, at least one benzofuranone or indolinone compound as described in 5) above and at least one aminic compound as described in 2) above;
g) mixtures of at least one phenolic compound as described in 1) above with at least one thiosynergist as described in 3); and
h) any of mixtures a)-f) above with at least one thiosynergist as described in 3).

The antioxidant(s), when used, is present in an effective amount, such as up to about 10 pph. A preferred amount is from 0.1 to 5 pph, and a more preferred amount is from 0.2 to 1.5 pph.

In some embodiments, a HALS (hindered amine light stabilizer) compound is present. Suitable HALS compounds include bis(1-octyloxy)-2,2,5,5-tetramethyl-4-piperidinyl) sebacate (Tinuvin™ 123 from BASF), n-butyl-(3,5-di-tert-butyl-4-hydroxylbenzyl)bis-(1,2,2,6-pentamethyl-4-piperidinyl)malonate (Tinuvin™ 144 from BASF), dimethyl succinate polymer with 4-hydroxy-2-2,6,6-tetramethyl-1-piperidinethanol (Tinuvin™ 622 from BASF), bis(1,2,2,6,6-pentamethyl-4-piperidinyl) sebacate (Tinuvin™ 765 from BASF) and bis(2,2,6,6-tetramethyl-4-piperidinyl) sebacate (Tinuvin™ 770 from BASF) and the like.

The HALS compound, when used, is present in an effective amount, such as up to about 10 pph in the aggregate. A preferred amount is from 0.1 to 5 pph in the aggregate, and a more preferred amount is from 0.1 to 2.5 pph.

Other ingredients may be present during the foaming step, including, for example, fillers, colorants, odor masks, flame retardants, biocides, antistatic agents, thixotropic agents and cell openers.

Polyurethane foam is made in accordance with this invention by forming a reaction mixture containing the various ingredients and curing the reaction mixture. Free-rise processes such as continuous slabstock production methods can be used. Alternatively, molding methods can be used. Such processes are well known. Generally, no alternation of conventional processing operations is needed to produce polyurethane foam in accordance with this invention (other than the inclusion of the polyethyleneamine mixture having a number average molecular weight of 175 to 450 and alkali metal, ammonium or phosphonium sulfite and optionally the antioxidant(s) and/or HALS compound).

The various ingredients may be introduced individually or in various subcombinations into a mixhead or other mixing device where they are mixed and dispensed into a region (such as a trough or other open container, or a closed mold) where they are cured. It is often convenient, especially when making molded foam, to form a formulated polyol component that contains the isocyanate-reactive compound(s), including crosslinkers and/or chain extenders as may be used, the polyethyleneamine mixture having a number average molecular weight of 175 to 450, alkali metal, ammonium or phosphonium sulfite, the antioxidant(s) and HALS compounds (if any), and optionally the catalyst(s), surfactant(s) and blowing agent(s). This formulated polyol component is then contacted with the polyisocyanate (as well as any other ingredients that are not present in the formulated polyol component) to produce the foam.

Some or all of the various components may be heated prior to mixing them to form the reaction mixture. In other cases, the components are mixed at approximately ambient temperatures (such as from 15-40° C.). Heat may be applied to the reaction mixture after all ingredients have been mixed, but this is often unnecessary.

The product of the curing reaction is a flexible polyurethane foam. The foam density may be from 20 to 200 kg/m$^3$. For most seating and bedding applications, a preferred density is from 24 to 80 kg/m$^3$. The foam may have a resiliency of at least 50% on the ball rebound test of ASTM 3574-H. Foams produced in accordance with this invention are useful, for example, in cushioning applications such as bedding and domestic, office or vehicular seating, as well as in other vehicular applications such as headrests, dashboards instrument panels, armrests or headliners.

Polyurethane foams made in accordance with the invention are characterized in having reduced emissions formaldehyde, acetaldehyde, acrolein and propionaldehyde compared to the case in which the polyethyleneamine mixture having a number average molecular weight of 175 to 450 and alkali metal, ammonium or phosphonium sulfite are absent. A suitable method for measuring formaldehyde, acetaldehyde, acrolein and propionaldehyde emissions is as follows: The polyurethane foam sample is crushed to open the cells. The crushed foam is cut into cubic 30 gram samples, which are immediately packaged tightly in aluminum foil or polyethylene film and kept in this manner for 5 days at about 25° C.

Aldehyde concentrations are measured according to the Toyota TSM0508G test method. In that Toyota method, the foam sample is removed from the foil or film and placed in individual 10 L Tedlar gas bags (Delin Co., Ltd., China) that has previously been purged three times with nitrogen gas. The bag with the foam sample is filled with 7 L of nitrogen, sealed and heated 65° C. for two hours. The plastic bag containing the foams is removed from the oven. The gas in the bag is pumped through a 350 mg dinitrophenylhydrazine cartridge to capture the carbonyl compounds. The captured carbonyl compounds are analyzed for formaldehyde, acetaldehyde, acrolein and propionaldehyde by liquid chromatography. Details for a specific method of performing the Toyota method are described in the following examples.

The amount of emitted formaldehyde, acetaldehyde, acrolein and propionaldehyde as determined by this method are all typically at least 20%, usually at least 50%, and sometimes as much as 80 to 98%, reduced as compared to an otherwise like foam that is produced in the absence of the polyethyleneamine mixture having a number average molecular weight of 175 to 450 and alkali metal, ammonium or phosphonium sulfite. An advantage of this invention is that significant reductions are seen in the emitted amounts of all four of these aldehyde compounds.

In some embodiments, the amount of emitted formaldehyde and amount of emitted acrolein each are no greater than 10 μg/m$^3$ or no greater than 5 μg/m$^3$, as measured according to the Toyota method. In some embodiments, the amount of emitted acetaldehyde is no greater than 100 μg/m$^3$, no greater than 50 μg/m$^3$, or no greater than 35 μg/m$^3$, as measured according to Toyota method. In some embodiments, the amount of emitted propionaldehyde is no greater than 60 μg/m$^3$ or no greater than 50 μg/m$^3$, as measured according to the Toyota method. The sum of emitted amounts of formaldehyde, acetaldehyde, acrolein and propionaldehyde in some embodiments is no greater than 150 μg/m$^3$, no greater than 100 μg/m$^3$, no greater than 75 μg/m$^3$ or no greater than 50 μg/m$^3$, as measured according to the Toyota method.

The following examples are provided to illustrate the invention, but are not intended to limit the scope thereof. All parts and percentages are by weight unless otherwise indicated.

EXAMPLE 1 AND COMPARATIVE SAMPLES A AND B

Formulated Polyol A is made by combining 45.34 parts of a glycerin-initiated poly(propylene oxide) capped with 15 percent ethylene oxide and having a hydroxyl number of 27.5 mg KOH/g; 50.11 parts of a copolymer polyol having a hydroxyl number of 22 mg KOH/g and containing 40 percent by weight copolymerized styrene and acrylonitrile solids dispersed in a polyether polyol; 0.48 part of diethanolamine, 0.38 part of glycerine, 0.27 part of a 33 percent triethylene diamine in dipropylene glycol, 0.17 part of a tertiary amine/glycol mixture available as C225 from Momentive Co., Ltd.; 1.15 parts of an organosilicone foam-stabilizing surfactant, 2.1 parts of water and 0.5 part of benzenepropanoic acid, 3,5-bis (1,1-dimethyl-ethyl)-4-hydroxy-C7-C9 branched alkyl esters (available as IRGANOX™ 1135 antioxidant from BASF (China) Co., Ltd).

Formulated Polyol B is made by combining 100.5 parts of Formulated Polyol A with 0.1 part of a polyethyleneimine having a number average molecular weight of about 600 in a high speed laboratory mixer.

Formulated Polyol C is made by combining 100.5 parts of Formulated Polyol A with 0.1 part of a polyethyleneimine having a number average molecular weight of about 600 and 0.1 part of sodium hydrogen sulfite (NaHSO$_3$) in a high speed laboratory mixer.

Formulated Polyol 1 is made by combining 100.5 parts of Formulated Polyol A with 0.1 part of a polyethyleneamine having a number average molecular weight of about 275 (Heavy Polyamine X from The Dow Chemical Company) and 0.1 part of sodium hydrogen sulfite (NaHSO$_3$) in a high speed laboratory mixer.

Each of Formulated Polyols A-C and 1 are stored at room temperature for 12-24 hours before being processed into a foam.

Comparative Sample A is made by combining 100 parts of Formulated Polyol A with 28 parts of a 20/80 by weight blend of toluene diisocyanate (TDI) and methylene diphenyldiisocyanate (MDI), pouring the resulting reaction mixture into a cup and allowing the reaction mixture to rise and cure to form a polyurethane foam. After the foam has cured enough to be dimensionally stable, it is removed from the cup and 30 gram sample cubes are cut. The foam cubes each are immediately wrapped in aluminum foil to form an airtight package for 7 days.

Comparative Sample B is made in the same manner, except 100 parts of Formulated Polyol B are combined with 28 parts of the same TDI/MDI blend.

Comparative Sample C is made in the same manner, except 100 parts of Formulated Polyol B are combined with 28 parts of the same TDI/MDI blend.

Example 1 is made in the same manner, except 101 parts of Formulated Polyol 1 are combined with 28 parts of the same TDI/MDI blend.

Aldehydes emitted from the foam samples are analyzed using the Toyota gas bag method. The cubed foam samples are in each case removed from the foil and put into a 10 L Tedlar gas bag that has been washed with pure nitrogen three times and emptied. An empty gas bag is used as a blank. After the foam sample is put into the gas bag, the bag is filled with about 7 L of nitrogen gas and heated in the oven for 2 hours at 65° C. The nitrogen gas in the gas bag is then pumped out by an air pump and analyzed for formaldehyde, acetaldehyde, acrolein (propenyl aldehyde) and propionaldehyde.

The gas from each bag is passed through a dinitrophenylhydrazine (DNPH) cartridge (CNWBOND DNPH-Silica cartridge, 350 mg, Cat. No. SEEQ-144102, Anple Co., Ltd.) at a sampling speed is 330 mL/min. The aldehydes emitted from the foam into the gas are absorbed by the cartridge to form DNPH derivatives. The DNPH cartridge is eluted with 3 g of acetonitrile, and the resulting acetonitrile solution is analyzed by HPLC to quantify the carbonyls in the sample, as follows.

A standard solution containing 15 μg/mL each of formaldehyde, acetaldehyde, acrolein and propionaldehyde (in each case in the form of DNPH derivatives) (TO11A carbonyl-DNPH mix, Cat. No. 48149-U, Supelco Co., Ltd) is diluted with acetonitrile. A vial containing 2 mL of the diluted solution (containing 0.794 ppm of each of formaldehyde, acetaldehyde, acrolein and propionaldehyde) is refrigerated to −4° C. The refrigerated solution is injected into the HPLC system and analyzed for formaldehyde, acetaldehyde, acrolein and propionaldehyde derivatives. The response factor is calculated from the area of the elution peak for each derivative, according the formula:

$$\text{Response factor } i = \frac{\text{Peak Area } i}{0.794}$$

where Response factor i=Response factor of derivative i; Peak Area i=Peak Area of derivative i in standard solution and 0.794=the concentration of each derivative in the standard solution.

The amounts of formaldehyde, acetaldehyde, acrolein and propionaldehyde emitted by each of Comparative Samples A and B and Example 1 are then determined. In each case, the acetonitrile solution obtained by eluting the DNPH column is injected into the HPLC system and the area of the elution peak is determined from each derivative. The concentration of the aldehyde-DNPH derivative in the sample solution is calculated as follows:

$$\text{Concentration of } i = \frac{\text{Peak Area } i}{\text{Response factor } i}$$

where: Concentration of i=Concentration of aldehyde-DNPH derivative in the sample solution, Peak Area i=Peak Area of Derivative i in sample solution and Response factor i=Response factor of derivative i, determined from the standard solutions as described above.

The HPLC conditions are as follows:

| Instrument: | Agilent 1200 HPLC |
|---|---|
| Column: | Supelco Ascentis Express C18, 15 cm*4.6 mm, 2.7 um |

-continued

| Mobile Phase: | Solvent A: 0.1% $H_3PO_4$ in Acetonitrile |
| | Solvent B: 0.1% $H_3PO_4$ in DI water |
| Column Oven: | 15° C. |
| Detection: | DAD detector at 360 nm |
| Gradient: | Time (mn) | % A | % B | Flow (mL/min) |
| | 0 | 45 | 55 | 1 |
| | 7 | 45 | 55 | 1 |
| | 14 | 50 | 50 | 1 |
| | 20 | 85 | 15 | 1 |
| | 25 | 100 | 0 | 1 |
| Equilibration Time: | 5 min |
| Injection: | 10 uL |

The concentrations of formaldehyde, acetaldehyde, acrolein and propionaldehyde for each of Comparative Samples A and B and Example 1 are as indicated in Table 1.

TABLE 1

|  | Comp. A* | Comp. B* | Comp. C* | Ex. 1 |
|---|---|---|---|---|
| Additives | 0.5% IRGANOX 1135 | 0.5% IRGANOX 1135 0.1% 600 MW PEI | 0.5% IRGANOX 1135 0.1% 600 MW PEI[2] 0.1% $NaHSO_3$ | 0.5% IRGANOX 1135 0.1% 275 MW polyethyleneamine 0.1% $NaHSO_3$ |
| Formaldehyde, μg/m³ | 9-13[1] | 13 | 3 | 0 |
| Acetaldehyde, μg/m³ | 111-115[1] | 142 | 29 | 20 |
| Acrolein, μg/m³ | 24-25[1] | 23 | 0 | 0 |
| Propionaldehyde, μg/m³ | 238-258[1] | 167 | 103 | 87 |
| Total Aldehydes, μg/m³ | 382-403[1] | 345 | 135 | 107 |

*Not an example of this invention.
[1]Range of values from duplicate experiments.
[2]PEI is polyethyleneimine.

When the antioxidant is present by itself (Comp. A), acetaldehyde and propionaldehyde values in particular are quite high, as are total aldehydes. Adding a 600 molecular weight polyethyleneimine (Comp. Sample B) by itself achieves a moderate reduction in aldehyde emissions.

Adding the 600 molecular weight polyethyleneimine together with sodium bisulfite (Comp. Sample C) is very effective in reducing all aldehydes. Surprisingly, however, replacing the 600 molecular weight polyethyleneimine with a 275 molecular weight polyethyleneamine (Ex. 1) results in a further 20% reduction from the already very low emissions exhibited by Comp. Sample C.

What is claimed is:

1. A process for producing a polyurethane foam comprising forming a reaction mixture that contains an aromatic polyisocyanate, at least one isocyanate-reactive material having an average functionality of at least 2 and an equivalent weight of at least 200 per isocyanate-reactive group, at least one blowing agent, at least one surfactant and at least one catalyst, and curing the reaction mixture in the presence of (i) from 0.03 to 0.25 parts by weight of a polyethyleneamine mixture having a number average molecular weight of at least 225 and up to 325 per 100 parts by weight of the at least one isocyanate reactive compound having at least two isocyanate-reactive groups per molecule and an equivalent weight of at least 200 per isocyanate-reactive group, (ii) 0.025 to 0.25 parts by weight of sodium hydrogen sulfite per 100 parts by weight of the at least one isocyanate reactive compound having at least two isocyanate-reactive groups per molecule and an equivalent weight of at least 200 per isocyanate-reactive group and (iii) an antioxidant which is a phenolic compound, to form the polyurethane foam.

2. A method for reducing aldehyde emissions from a polyurethane foam, comprising: a) combining (i) a polyethyleneamine mixture having a number average molecular weight of at least 225 and up to 325, (ii) sodium hydrogen sulfite and (iii) and antioxidant which is a phenolic compound with at least one isocyanate-reactive material having an average functionality of at least 2 and an equivalent weight of at least 200 per isocyanate-reactive group in amounts to provide 0.03 to 0.25 parts by weight of the polyethyleneamine mixture and 0.025 to 0.25 parts by weight of the sodium hydrogen sulfite per 100 parts by weight of the at least one isocyanate reactive compound having at least two isocyanate-reactive groups per molecule and an equivalent weight of at least 200 per isocyanate-reactive group to form a mixture and then b) combining the mixture from step a) with at least one organic polyisocyanate and curing the resulting reaction mixture in the presence of at least one blowing agent, at least one surfactant and at least one catalyst to form a polyurethane foam.

3. The process of claim 1 wherein the polyethyleneamine mixture includes compounds having either of the following structures I and II:

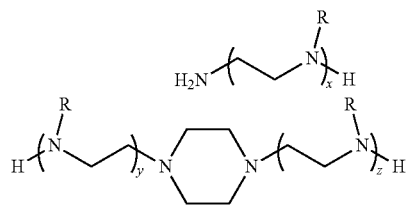

(I)

wherein x and y each are positive numbers, z is zero or a positive number and each R is independently hydrogen, ethyleneamine or linear, branched and/or cyclic polyethyleneamine.

4. The method of claim 1 wherein the antioxidant is present in an amount of 0.2 to 1.5 parts by weight per 100 parts by weight of the at least one isocyanate reactive compound having at least two isocyanate-reactive groups per molecule and an equivalent weight of at least 200 per isocyanate-reactive group.

5. A polyurethane foam made in accordance with the process of claim 1.

* * * * *